United States Patent
Cruz et al.

(10) Patent No.: US 10,703,830 B2
(45) Date of Patent: Jul. 7, 2020

(54) PROCESS FOR PREPARING A (METH)ACRYLATE ADDITIVE, A METHOD OF IMPROVING THE SAG RESISTANCE OF A POLYOLEFIN AND A SAG RESISTANT POLYOLEFIN

(71) Applicant: Rohm and Haas Company, Philadelphia, PA (US)

(72) Inventors: Carlos A. Cruz, Spring House, PA (US); Morris C. Wills, Spring House, PA (US)

(73) Assignee: Rohm and Haas Company, Collegeville, PA (US)

( * ) Notice: Subject to any disclaimer, the term of this patent is extended or adjusted under 35 U.S.C. 154(b) by 0 days.

(21) Appl. No.: 15/532,314

(22) PCT Filed: Nov. 29, 2015

(86) PCT No.: PCT/US2015/062864
§ 371 (c)(1),
(2) Date: Jun. 1, 2017

(87) PCT Pub. No.: WO2016/094093
PCT Pub. Date: Jun. 16, 2016

(65) Prior Publication Data
US 2017/0267788 A1    Sep. 21, 2017

Related U.S. Application Data

(60) Provisional application No. 62/088,732, filed on Dec. 8, 2014.

(51) Int. Cl.
| | | |
|---|---|---|
| C08F 2/18 | (2006.01) | |
| C08F 2/20 | (2006.01) | |
| C08F 2/26 | (2006.01) | |
| C08F 2/28 | (2006.01) | |
| C08F 220/18 | (2006.01) | |
| C08F 265/04 | (2006.01) | |
| C08L 23/04 | (2006.01) | |
| C08F 4/00 | (2006.01) | |
| C08F 10/02 | (2006.01) | |
| C08L 51/00 | (2006.01) | |

(52) U.S. Cl.
CPC .......... C08F 2/20 (2013.01); C08F 4/00 (2013.01); C08F 10/02 (2013.01); C08F 220/18 (2013.01); C08F 265/04 (2013.01); C08L 23/04 (2013.01); C08L 51/00 (2013.01)

(58) Field of Classification Search
CPC ...... C08F 2/18; C08F 2/20; C08F 2/26; C08F 2/28
See application file for complete search history.

(56) References Cited

U.S. PATENT DOCUMENTS

| | | | |
|---|---|---|---|
| 4,767,823 A | 8/1988 | Jones et al. | |
| 5,229,546 A | 7/1993 | Ilenda et al. | |
| 5,264,315 A * | 11/1993 | Tan | B01J 19/1862 430/110.2 |
| 5,304,447 A * | 4/1994 | Svendsen | G03G 9/0926 428/402.24 |
| 5,338,808 A | 8/1994 | Ghisolfi | |
| 5,446,064 A | 8/1995 | Hori et al. | |
| 5,496,897 A * | 3/1996 | Yoshimatsu | C08F 257/02 525/257 |
| 6,784,246 B2 | 8/2004 | Cruz et al. | |
| 6,875,802 B2 | 4/2005 | Cruz et al. | |
| 6,884,844 B2 * | 4/2005 | Hamilton | C08F 257/02 525/316 |
| 7,763,692 B2 | 7/2010 | Tamai et al. | |

FOREIGN PATENT DOCUMENTS

| | | |
|---|---|---|
| EP | 1234841 | 8/2002 |
| EP | 1236750 | 9/2002 |
| JP | 3074673 | 8/2000 |
| WO | WO 00/18827 | 4/2000 |
| WO | WO2008/002952 | 1/2008 |

OTHER PUBLICATIONS

EP Office Action dated Oct. 9, 2017; from counterpart EP Application No. 15816942.5.
PCT Search Report dated Mar. 22, 2016; from PCT counterpart Application No. PCT/US2015/062864.
PCT IPRP dated Jun. 13, 2017; from PCT counterpart Application No. PCT/US2015/062864.
Chinese Office Action received Jan. 1, 2019; from counterpart Chinese Application No. 201580064085.2.
Chinese office action received Oct. 29, 2019; from counterpart Chinese Application No. 201580064085.2.

* cited by examiner

Primary Examiner — Vu A Nguyen

(57) ABSTRACT

A process for preparing a (meth)acrylate comprising preparing an aqueous phase by combining water, one or more stabilizing agents, and one or more surfactants; preparing an oil phase by combining one or more free radical initiators, one or more monomers capable of undergoing radical polymerization, one or more crosslinking and/or graft-linking monomers, and stearyl methacrylate and/or lauryl methacrylate, wherein the free radical initiator is capable of partitioning preferentially into the oil phase; combining the aqueous and oil phases and mixing to form a suspension having oil droplets ranging in size from 1 to 10 microns; raising the temperature of the suspension to effect an initial polymerization forming a core polymer is provided.

4 Claims, No Drawings

PROCESS FOR PREPARING A (METH)ACRYLATE ADDITIVE, A METHOD OF IMPROVING THE SAG RESISTANCE OF A POLYOLEFIN AND A SAG RESISTANT POLYOLEFIN

FIELD OF INVENTION

The disclosure relates to a process for preparing a (meth)acrylate additive, a method of improving the sag resistance of a polyolefin and a sag resistant polyolefin.

BACKGROUND OF THE INVENTION

Polyolefins (for example, polyethylene and polypropylene) are melt processed above their crystalline melting points. The melt strength of the polyolefin, if too low, may cause difficulty in melt processing processes, such as thermoforming and blow molding. Low melt strength is exhibited as sag or drool.

Sag is a surrogate measurement that relates to both melt elasticity and melt strength. Good sag resistance is conducive to enhancement of thermoformability in plastics (J. L. Throne, Technology of Thermoforming, Hanser-Gardner Publications, Inc., Cincinnati Ohio, 1996). Several approaches to produce melt-strength have been developed over the years. Irradiating polypropylene to obtain long-chain branching and, consequently, high melt strength, has been commercialized. This method involves careful control of the irradiation process and may lead to the undesirable production of gels. Treatment of LLDPE with organic peroxides is another route to obtain a polyolefin with high melt strength although, as in the irradiation case, the process involves a chemical reaction that must be closely controlled to produce the desired effect.

Alternatively, additives have been used to improve melt strength, such as Mitsubishi Rayon's A-3000 which is a commercial product based on an acrylic polymer and polytetrafluoroethylene (PTFE). Chemically modified LLDPE, as is the case of DuPont's BOOSTER, is another example of the additive approach to enhance melt strength in polyolefins. Long-chain acrylic monomers as additives to improve melt strength have been used but the synthetic route to obtain such additives is cumbersome.

SUMMARY OF THE INVENTION

The disclosure is for a process for preparing a (meth)acrylate additive, a method of improving the sag resistance of a polyolefin and a sag resistant polyolefin.

In one embodiment, the disclosure provides a process for preparing a (meth)acrylate comprising preparing an aqueous phase by combining water, one or more stabilizing agents, and one or more surfactants; preparing an oil phase by combining one or more free radical initiators, one or more monomers capable of undergoing radical polymerization, one or more crosslinking and/or graft-linking monomers, stearyl methacrylate and/or lauryl methacrylate, wherein the free radical initiator is capable of partitioning preferentially into the oil phase; combining the aqueous and oil phases and mixing to form a suspension having oil droplets ranging in size from 1 to 10 microns; raising the temperature of the suspension to effect an initial polymerization forming a core polymer.

DETAILED DESCRIPTION OF THE INVENTION

The disclosure provides a process for preparing a (meth)acrylate additive, a method of improving the sag resistance of a polyolefin and a sag resistant polyolefin.

Polyolefin or olefin-based polymer means a polymer having greater than 50 wt % units derived from one or more olefinic monomers.

Polyethylene or ethylene-based polymer means a polymer having greater than 50 wt % units derived from ethylene monomer.

(Meth)acrylate means acrylate, methacrylate, or combinations of acrylate and methacrylate. For example, the term methyl(meth)acrylate may mean solely methyl methacrylate, solely methyl acrylate or a combination of methyl methacrylate and methyl acrylate.

In a first aspect, the present disclosure provides a process for preparing a (meth)acrylate additive for polyolefins comprising preparing an aqueous phase by combining water, one or more stabilizing agents, and one or more surfactants; preparing an oil phase by combining one or more free radical initiators, one or more monomers capable of undergoing radical polymerization, one or more crosslinking and/or graft-linking monomers, and stearyl methacrylate and/or lauryl methacrylate, wherein the free radical initiator is capable of partitioning preferentially into the oil phase; combining the aqueous and oil phases and mixing to form a suspension having oil droplets ranging in size from 1 to 10 microns; raising the temperature of the suspension to effect an initial polymerization forming a core polymer.

The aqueous phase comprises water, one or more stabilizing agents, and one or more surfactants. The one or more stabilizing agents may be any such agent as is useful in the art of emulsion polymerization. Examples of such stabilizing agents include, water soluble polymers or steric stabilizers, such as, polyvinyl alcohols, hydroxyethyl celluloses, polyesters, and poly(N-vinyl pyrrolidone). Examples of one or more surfactants include, but are not limited to, anionic surfactants, such as DISPONIL FES-32, and cationic surfactants.

The oil phase comprises one or more free radical initiators, one or more monomers capable of undergoing radical polymerization, one or more crosslinking and/or graft-linking monomers, and stearyl methacrylate and/or lauryl methacrylate, wherein the free radical initiator is capable of partitioning preferentially into the oil phase. "Partitioning preferentially in to the oil phase" means having an oil solubility greater than water solubility. Examples of free radical initiators which preferentially partition into the oil phase include, but are not limited to, lauroyl peroxide and t-butyl peroctoate, azobisisobutyronitrile (AIBN), azo compounds (compounds bearing the functional group R—N=N—R', in which R and R' can be either aryl or alkyl), peroxides, peroxy esters, and hydroperoxides. Examples of one or more monomers capable of undergoing radical polymerization include, but are not limited to, alkyl (meth)acrylates, cycloalkyl (meth)acrylates, and aryl (meth)acrylates, such as butyl acrylate, ethyl acrylate, 2-ethyl hexyl acrylate, propyl acrylate, methyl acrylate, hexyl acrylate, butylmethacrylate, methylmethacrylate, ethylhexyl methacrylate, and benzyl acrylate. Examples of the one or more crosslinking and/or graft-linking monomers include, but are not limited to, divinylbenzene, trimethylolpropane triacrylate, ethylene glycol dimethacrylate, trimethylolpropane trimethacrylate, allyl methacrylate, diallyl phthalate, diallylacrylamide, triallyl (iso)cyanurate, triallyl trimellitate, (poly)alkylene glycol, 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, dipentaerythritol hexa(meth)acrylate, dipentaerythritol penta(meth)acrylate, graft-linking monomers having two or more non-conjugated double bonds of differing reactivity, such as allyl methacrylate, diallyl maleate and allyl acryloxypropionate, and combinations thereof.

The combining the aqueous and oil phases and mixing to form a suspension having oil droplets ranging in size from 1 to 10 microns may be accomplished by any acceptable means, including, for example, batch mixing, such as with a high speed rotor stator, or continuous addition mixing at high shear. All ranges from 1 to 10 microns are included and disclosed herein; for example, the oil droplet size can range from a lower limit of 1, 3, 5, 7 or 9 microns to an upper limit of 2, 4, 6, 8 or 10 microns. For example, the oil droplet size can range from 1 to 10 microns, or in the alternative, from 1 to 5 microns, or in the alternative, from 5 to 10 microns, or in the alternative, from 4 to 8 microns, or in the alternative, from 3 to 7 microns.

Following the combining of the aqueous and oil phases, the temperature of the suspension is raised to effect an initial polymerization forming a core polymer. Because the free radical initiator preferentially partitions into the oil droplets, polymerization occurs preferentially in the oil droplets. In a particular embodiment, the temperature of the suspension is raised to a temperature from 65 to 100° C. All individual values and subranges from 65 to 100° C. are included and disclosed herein; for example, the temperature to which the suspension is raised may range from a lower limit of 65, 76, 85 or 95° C. to an upper limit of 70, 80, 90 or 100° C. For example, the suspension may be raised to a temperature from 65 to 100° C., or in the alternative, from 65 to 85° C., or in the alternative, from 80 to 100° C., or in the alternative, from 75 to 95° C.

The disclosure further provides the process of any embodiment disclosed herein except that at least 90 wt % of the total amount of the stearyl methacrylate and/or lauryl methacrylate is incorporated into polymer formed during the initial polymerization. All individual values and subranges from at least 90 wt % are included and disclosed herein. For example, the amount of the stearyl methacrylate and/or lauryl methacrylate during initial polymerization can be at least 90 wt %, or in the alternative, at least 92 wt %, or in the alternative, at least 94 wt %, or in the alternative, at least 96 wt %.

The disclosure further provides the process of any embodiment disclosed herein except that the process further comprises adding a solution which comprises one or more monomers capable of radical polymerization while maintaining the temperature during the initial polymerization to effect a second polymerization; optionally adjusting the temperature for the second polymerization. The one or more monomers capable of radical polymerization added in this additional step may be the same or different from the monomers capable of radical polymerization added in the formation of the oil phase. The temperature may optionally be adjusted for the second polymerization. The temperature may be adjusted upward or downward to effect the second polymerization. In a particular embodiment, temperature of the suspension is adjusted to a temperature from 40 to 125° C. All individual values and subranges 40 to 125° C. are included and disclosed herein; for example, the temperature may be adjusted to a temperature ranging from a lower limit of 40, 60, 80, 100 or 120° C. to an upper limit of 45, 65, 85, 105 or 125° C. For example, temperature may be adjusted from 40 to 125° C., or in the alternative, from 40 to 65° C., or in the alternative, from 50 to 75° C., or in the alternative, from 75 to 125° C., or in the alternative, from 85 to 125° C.

Polyolefin or olefin-based polymer means a polymer having greater than 50 wt % units derived from one or more olefinic monomers. Olefin-based polymers include, but are not limited to, polyethylenes and polypropylenes of all density ranges. Polyethylenes include ethylene homopolymer, ethylene copolymers, such as ethylene/alpha-olefin copolymers, and ethylene interpolymers having units derived from ethylene (greater than 50 wt %) and from at least two other monomers. Polypropylenes include propylene homopolymer, propylene copolymers, such as propylene/alpha-olefin copolymers and propylene/ethylene copolymers, and propylene interpolymers having units derived from propylene (greater than 50 wt %) and from at least two other monomers.

The disclosure further provides the process of any embodiment disclosed herein except that the process further comprises adding a solution which comprises one or more monomers capable of radical polymerization while maintaining the temperature during the initial polymerization to effect a second polymerization; optionally adjusting the temperature for the second polymerization and further comprising adding a flow aid to form a core/shell polymer suspension; and spray drying the core/shell polymer suspension to form a free flowing powder of core/shell polymer. Any appropriate flow aid may be used. A flow aid is a hard material in the form of a powder (mean particle diameter of 1 micrometer to 1 mm). The material of the flow aid may be a hard polymer (Tg of 80° C. or higher; or 95° C. or higher) or may be a mineral (such as, for example, silica).

The disclosure further provides a method of modifying the sag resistance of an olefin-based polymer comprising adding from 1 to 5 wt % of the core polymer according to any embodiment disclosed herein and/or the core/shell polymer according to any embodiment disclosed herein to one or more polyolefins. All individual values and subranges from 1 to 5 wt % are disclosed and included herein; for example the amount of the core and/or core/shell polymer added to the olefin-based polymer may range from a lower limit of 1, 2, 3, or 4 wt % to an upper limit of 2, 3, 4, or 5 wt %, based on the combined weight of the olefin-based polymer and the core and/or core/shell polymer. For example, the amount of core and/or core/shell polymer may range from 1 to 5 wt %, or in the alternative, from 1 to 2.5 wt %, or in the alternative, from 2.5 to 5 wt %, or in the alternative, from 2.2 to 3.8 wt %.

The disclosure further provides a polyolefin having improved sag resistance comprising one or more olefin-based polymers; and one or more core polymers according to any embodiment disclosed herein and/or one or more core/shell polymers according to any embodiment disclosed herein. In a particular embodiment, the polyolefin having improved sag resistance has greater sag resistance than the one or more olefin-based polymers in the absence of the one or more core polymers according to any embodiment disclosed herein and/or one or more core/shell polymers according to claim 8.ny embodiment disclosed herein.

EXAMPLES

The following examples illustrate the present invention but are not intended to limit the scope of the invention.

Preparation of Inventive Microbeads Example 1

An aqueous phase was prepared by dissolving 10 parts of poly(N-vinyl pyrrolidone) (stabilizing agent) having a number average molecular weight of 55,000 daltons (commercially obtained from Sigma-Aldrich Corp. (St. Louis, Mo., USA)) in 468.31 parts of deionized water. Also added to the aqueous phase were 0.5 parts of a 5% aqueous solution of 4 hydroxy TEMPO (4-hydroxy-2,2,6,6-tetramethylpiperidine 1-oxyl) (aqueous phase free radical inhibitor), 0.025 parts of DREWPLUS 4281 silicone antifoaming agent (which is commercially available from Ashland, Inc. (Covington, Ky., USA)) and 3.33 parts of a 30% solution of DISPONIL FES-32 (a fatty ether sulfate anionic surfactant, which is commercially available from BASF (Ludwigshafen, Germany)). The oil phase was prepared by combining 3.75 parts of methacrylic acid (MAA), 371.06 parts of stearyl methacrylate (SMA), 0.188 parts of allyl methacrylate (ALMA) and 10.31 parts of Luperox LP (lauryl peroxide, a free radical initiator) which is commercially available from Aldrich-Sigma. Both the aqueous phase and oil phase individually form homogeneous solutions. The aqueous and oil phases were combined and emulsified in a high speed rotor stator mixer (Cyclone I Q SENTRY microprocessor) at 15,000 RPM for 6 minutes. The average droplet size of the oil phase was about 2 microns as measured from a MALVERN light scattering particle size instrument. The mixture was then added to a 2 liter, 4-necked round bottomed flask fitted with a thermocouple, heating mantel, condenser and mechanical stirrer. The reaction mixture was heated to 85° C. for 1 hour to effect polymerization. The conversion of SMA monomer was 99% as measured by NMR. A solution containing 1.25 parts of methacrylic acid, 122.5 parts of methyl methacrylate (MMA) and 1.25 parts of butyl acrylate (BA) were then added dropwise to the reaction mixture at 85° C. over 15 minutes. After 45 additional minutes the reaction was cooled to 60° C. The following reagents were added in sequence: 0.022 parts of ferrous sulfate, 0.29 parts of t-amyl hydroperoxide and 0.32 parts of hydroxyl methane sulfenic acid, sodium salt. Residual monomers were measured by head space gas chromatography (MMA=94 ppm, BA<10 ppm). At 25° C. 250 parts of a 40% MMA based (Tg greater than 75° C.) acrylic latex was added as a flow aid for the subsequent isolation of the microbeads by spray drying. A free flowing powder was obtained after spray drying. MMA and MAA are commercially available from The Dow Chemical Company.

Inventive Microbead Example 2 was prepared as described above, except that no ALMA was added with the SMA.

Inventive Microbead Example 3 was prepared as described above, except that lauryl methacrylate (LMA) was used instead of SMA.

Inventive Microbead Examples 1 and 2 were added to at a variety of concentrations as shown in Table 1 to ELITE 5400G, a linear low density polyethylene (LLDPE) which is commercially available from The Dow Chemical Company. The resulting modified LLDPE was subjected to sag testing and the results are shown in Table 1. Table 1 further shows the sag testing results for LLDPE 5400G in the absence of any modifier (Comparative Example 1) and with the addition of LMA-1, a spray dried lauryl methacrylate emulsion polymer (with 0.05 wt % ALMA) (Comparative Examples 2-4). LMA-1 is produced according to the following procedure:

A conventional emulsion polymer with LMA as the core stage and a styrene and MMA shell is prepared with sodium persulfate as initiator and DISPONIL FES-32 as anionic surfactant. DISPONIL FES-32 is a fatty alcohol polyglycol ether sulphate, Na-salt, which is commercially available from BASF (Freeport, Tex.). The LMA to shell ratio is typically 70/30 by monomer weight. The final latex solids are typically about 48% with an average particle size of about 200 nm. The LMA stage contains about 0.05% ALMA which yields a branched, but un-crosslinked polymer structure having a weight average molecular weight of about 750,000 to 1 million Daltons. The latex is isolated to a powder by spray drying.

The LMA used to produce the examples was ROCRYL 320, which is commercially available from The Dow Chemical Company. The SMA used to produce the examples is commercially available from Sigma-Aldrich Corporation (St. Louis, Mo., USA). The ALMA used to produce the examples is commercially available from Sigma-Aldrich Corp.

Table 1 provides the sag results of ELITE 5400G with and without modifier, as shown in the table.

TABLE 1

| Example | Amount Modifier in ELITE 5400G | Sag in Inches | | | | |
| --- | --- | --- | --- | --- | --- | --- |
| | | 1 min | 2 min | 3 min | 4 min | 5 min |
| Comp. Ex. 1 | None | 0 | 0.25 | 1.5 | 4 | X |
| Comp. Ex. 2 | 2.5 wt % LMA-1 | 0 | 0.13 | 0.75 | 2 | 4 |
| Comp. Ex. 3 | 5 wt % LMA-1 | 0 | 0 | 0 | 0.13 | 0.25 |
| Comp. Ex. 4 | 10 wt % LMA-1 | 0 | −0.13 | −0.25 | −0.25 | −0.13 |
| Inv. Ex. 1 | 10 wt % Inventive Microbead Ex. 1 (SMA/MMA with 0.05 wt % ALMA, LUPEROX LP) | 0 | 0.13 | 0.75 | 2.25 | 5 |
| Inv. Ex. 2 | 2.5 wt % Inventive Microbead Ex. 2 (SMA/MMA with 0.0 wt % ALMA, LUPEROX LP) | 0.00 | 0.50 | 1.75 | 5.00 | X |
| Inv. Ex. 3 | 10 wt % Inventive Microbead Ex. 3 (LMA/MMA with 0.05 wt % ALMA, LUPEROX LP) | 0 | 0.25 | 1.75 | 5 | X |

Additional Inventive Microbead Examples were prepared according to the procedure described above, except that t-butyl peroxide (tBPO) was used as the initiator instead of lauryl peroxide. tBPO initiator (TRIGONOX 21S) was obtained from AkzoNobel (Amsterdam, The Netherlands).

Specifically, Inventive Microbead Example 4 was made with SMA, no ALMA; Inventive Microbead Example 5 was made with SMA, 0.033 wt % ALMA; Inventive Microbead Example 6 was made with SMA, 0.067 wt % ALMA; and Inventive Microbead Example 7 was made with SMA, 0.1 wt % ALMA. Inventive Microbead Examples 4-7 were added to a high density polyethylene (HDPE), CONTINUUM DGDA 2490NT, which is commercially available from The Dow Chemical Company, each at 5 wt % and 10 wt %. The modified high density polyethylene was then subjected to modified sag testing and the results are shown in Table 2. Table 2 further provides sag testing on the high density polyethylene modified with Bulk SMA/tBPO. Bulk SMA/tBPO was prepared by feeding a solution of SMA/tBPO into pure water at 85° C. It forms a polymerized mass that must be isolated by breaking the flask and then drying in a vacuum oven.

TABLE 2

| Example | Amount Modifier in CONTINUUM DGDA 2490NT | Sag in Inches | | | | |
|---|---|---|---|---|---|---|
| | | 1 min | 2 min | 3 min | 4 min | 5 min |
| Inv. Ex. 4 | 5 wt % Inventive Microbead Ex. 4 (SMA/no ALMA/tBPO) | 0.00 | 1.00 | 2.00 | X | |
| Inv. Ex. 5 | 5 wt % Inventive Microbead Ex. 5 (SMA/0.033% ALMA/tBPO) | 0.00 | 0.50 | 2.00 | 4.00 | 5.00 |
| Inv. Ex. 6 | 5 wt % Inventive Microbead Ex. 6 (SMA/0.067% ALMA/tBPO) | 0.00 | 0.50 | 3.00 | 5.00 | X |
| Inv. Ex. 7 | 5 wt % Inventive Microbead Ex. 7 (SMA/0.1% ALMA/tBPO) | 0.00 | 0.50 | 3.00 | 5.00 | X |
| Inv. Ex. 8 | 10 wt % Inventive Microbead Ex. 4 | 0.00 | 0.50 | 5.00 | X | X |
| Inv. Ex. 9 | 10 wt % Inventive Microbead Ex. 5 | 0.00 | 1.00 | 5.00 | X | X |
| Inv. Ex. 10 | 10 wt % Inventive Microbead Ex. 6 | 0.00 | 3.00 | 5.00 | X | X |
| Inv. Ex. 11 | 10 wt % Inventive Microbead Ex. 7 | 0.00 | 2.00 | 5.00 | X | X |
| Comp. Ex. 5 | 5 wt % Bulk SMA/tBPO | 0.00 | 3.00 | 5.00 | X | X |
| Comp. Ex. 6 | 10 wt % Bulk SMA/tBPO | 0.00 | 1.00 | 5.00 | X | X |

Inventive Microbead Ex. 4 was also tested as a modifier in ELITE 5400G and the modified LLDPE sag tested. The sag testing results are shown in Table 3.

TABLE 3

| Example | Amount Modifier in ELITE 5400G | Sag in Inches | | | | |
|---|---|---|---|---|---|---|
| | | 1 min | 2 min | 3 min | 4 min | 5 min |
| Inv. Ex. 12 | 2.5 wt % Inventive Microbead Ex. 4 (SMA/no ALMA/tBPO) | 0.00 | 0.00 | 0.00 | 0.25 | 0.50 |

Test Methods

Test methods include the following:

Sag Testing

Test strips with dimensions of 1 mm (0.04 inch)×0.5 inch×5 inches were suspended in a Blue M convection oven set to a temperature of 140° C. (for LLPDE) by clamping the top 0.5 inch of the specimen with a butterfly clip hanging from a steel rod. Adjacent to the test strip was a ruler graduated in inches set so the bottom of the test strip corresponded to the zero inch mark of the ruler (with downward being the positive direction). A stopwatch was used to measure the elongation (sag) of the test strip by observation through the sight glass on the oven door. The data recorded was elongation vs. time. In the case of HDPE a 14 gram weight was clamped to the bottom of the test strip and the oven set temperature was 160° C. The hanging weight was simply a butterfly clip with a weight of 14 grams and was attached to the bottom 0.5 inch of the test specimen.

The polymer (with and without modifier) were milled, molded and cut into 0.5 by 5 by 0.04 inch test strips for sag resistance testing. The milling and molding conditions for preparation of sheets cut into sag resistance test strips was as follows: Polyethylene pellets were blended with modifier (150 grams total) and melt processed on an electric 2 roll mill (COLLIN Mill Type # WW 150 p). The mill temperature was set at 150° C. with the front roll mill speed at 26 RPM and the back at 21 RPM. The polymer blend was melt processed for a total time of 5 minutes. The sample was then place in a 1 mm (0.04 inch)×8.5 inch×10 inch mold and pressed in a RELIABLE press at 150° C. for 3 minutes at 15 tons and then 2 minutes at 45 tons. Cooling was accomplished under 45 tons for an additional 3-4 minutes. Samples were cut into test strips with dimensions of 1 mm (0.04 inch)×0.5 inch×5 inches.

The present invention may be embodied in other forms without departing from the spirit and the essential attributes thereof, and, accordingly, reference should be made to the appended claims, rather than to the foregoing specification, as indicating the scope of the invention.

We claim:

1. A process for preparing a (meth)acrylate comprising:
   preparing an aqueous phase by combining water, one or more stabilizing agents including poly(N-vinyl pyrrolidone), and one or more surfactants selected from anionic surfactants and cationic surfactants;
   preparing an oil phase by combining one or more free radical initiators, a first monomer blend of one or more monomers capable of undergoing radical polymerization, one or more crosslinking and/or graft-linking monomers, and stearyl methacrylate and/or lauryl methacrylate, wherein the free radical initiator is capable of partitioning preferentially into the oil phase;
   combining the aqueous and oil phases and mixing to form a suspension having oil droplets ranging in size from 1 to 10 microns; and
   raising the temperature of the suspension to effect an initial polymerization forming a core polymer;
   adding a solution which comprises a second monomer blend of one or more monomers capable of radical polymerization after the initial polymerization to effect a second polymerization, wherein the first and second monomer blends do not have the same composition;
   adjusting the temperature for the second polymerization;
   adding a flow aid to form a core/shell polymer suspension; and
   spray drying the core/shell polymer suspension to form a free flowing powder of core/shell polymer.

2. The process of claim 1, wherein the one or more free radical initiators is lauroyl peroxide and/or t-butyl peroctoate.

3. The process according to claim 1, wherein the mixing is by a high speed rotor stator mixer.

4. The process according to claim 1, wherein at least 90 wt % of the stearyl methacrylate and/or lauryl methacrylate is incorporated into polymer formed during the initial polymerization.

\* \* \* \* \*